July 9, 1957

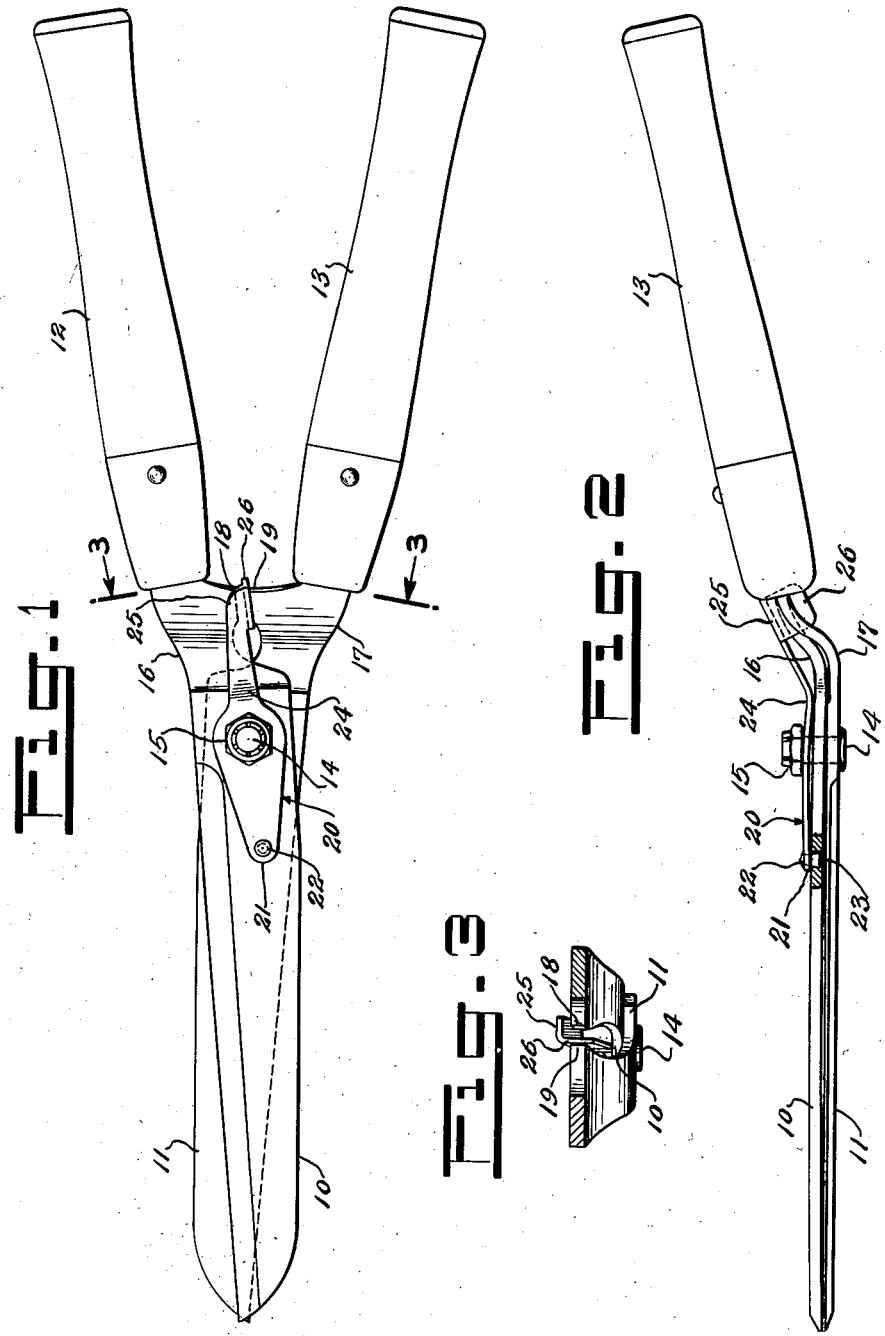

J. L. SMITH 2,798,291

COMBINATION BLADE TENSIONING AND SHOCK
CUSHIONING MEANS FOR HEDGE SHEARS

Filed June 7, 1956

INVENTOR.
JUSTIN L. SMITH
BY
H. G. Manning
ATTORNEY

United States Patent Office 2,798,291
Patented July 9, 1957

2,798,291

COMBINATION BLADE TENSIONING AND SHOCK CUSHIONING MEANS FOR HEDGE SHEARS

Justin L. Smith, Watertown, Conn., assignor to Seymour Smith & Son, Inc., Oakville, Conn., a corporation of Connecticut Application June 7, 1956, Serial No. 589,968

6 Claims. (Cl. 30—269)

This invention relates to agricultural implements, and more particularly to an improvement in hedge shears.

One object of this invention is to provide a pair of hedge shears having shock absorbing means designed to reduce or eliminate fatigue due to rapid and continuous or repeated closing of the blades of the shears such as was usually experienced with prior devices of this type.

Another object is to provide tension controlling means for hedge shears, which serves not only to maintain the blades in cutting engagement with each other but also tends to absorb shocks normally resulting from repeated opening and closing of the blades.

A further object is to provide a device of the above nature which will be simple in construction, inexpensive to manufacture, easy to install and manipulate, compact, ornamental in appearance, and very efficient and durable in use.

With these and other objects in view, there have been illustrated on the accompanying drawings, two forms in which the invention may conveniently be embodied in practice.

In the drawings,

Fig. 1 represents a top plan view of one form of hedge shears embodying the present invention.

Fig. 2 is a side view of the same.

Fig. 3 is a cross section, taken on the line 3—3 of Fig. 1.

Figure 4:
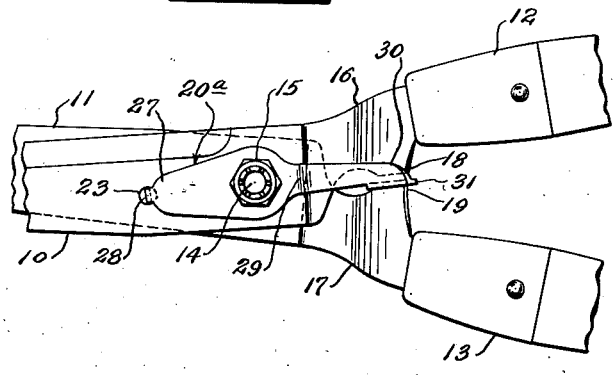
Fig. 4 is a fragmentary top view of a modified form of the invention.

Referring now to the drawings, in which like reference numerals denote corresponding parts throughout the several views, the numerals 10 and 11 indicacte a pair of elongated cooperating shearing blades having rearwardly extending attached handles 12 and 13 respectively, and being suitably apertured to receive a bolt 14 which serves as a fulcrum for relative oscillation of the blades 10 and 11. In accordance with the usual practice, the shearing blades 10 and 11 are bowed and inclined slightly toward each other along their length and are assembled on the fulcrum bolt 14 in overlapping relationship and retained thereon by the adjustable lock nut 15, since the rearwardly extending shanks 16 and 17 of the blades 10 and 11 respectively are bent upwardly slightly for convenience in manipulating the device. The shank 17 of the lower of the two blades is elevated to a slightly greater degree than the shank 16 so that inwardly extending bosses 18 and 19 which are formed at the rear ends of the respective shanks 16 and 17 will lie substantially in the same horizontal plane for abutment with one another to limit inward movement of the handles 12 and 13.

In order to insure proper contact between the cutting edges of the blades 10 and 11 along their entire length during oscillatory movement thereof, some form of tension controlling means must be associated with the fulcrum bolt 14 to exert inward pressure against the blades at this point. In the present invention one form of such means is indicated generally by the numeral 20 and comprises an elongated strip of flat spring steel which is apertured at a point medially of its ends to be loosely received on the bolt 14 between the upper blade 10 and the nut 15. The forward end 21 of the tension controlling means 20 is adapted to bear against the upper surface of the top blade 10 and is provided with downwardly extending means such as a rivet 22 to be received in a recess 23 provided in the blade 10 so as to prevent relative rotation of the tension controlling means 20 with respect to the blade 10 for a purpose which will be hereafter explained.

The flat strip 20 is bent so as to form a downwardly extending hump 24 just to the rear of the fulcrum bolt 14, while that portion of the strip which extends between the forward end 21 and the downward hump 24 is formed with a slight upward curvature, whereby varying amounts of tension may be exerted on the blades 10 and 11 by adjustment of the lock nut 15.

The rear end 25 of the strip 20 is provided with a downwardly turned longitudinally extending flat ear 26 which is positioned at a slight distance away from the inwardly extending boss 18, and extends downwardly between the bosses 18 and 19.

Second form

Figure 5:
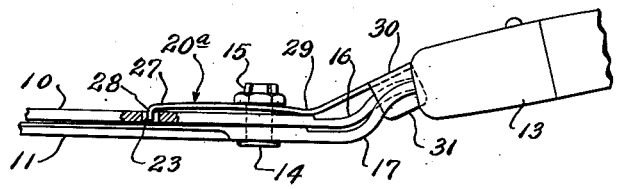
Fig. 5 is a fragmentary side view of the same.

In the modified form of tension controlling means indicated generally at 20a in Figs. 4 and 5, the forward end 27 of an elongated strip of flexible sheet metal is provided with a downwardly turned narrow nib 28 which is received in the recess 23 of the upper blade 10.

The strip 20a, as in the case of the previously described form 20, is also provided with an aperture disposed medially of its ends to be rotatably received on the fulcrum bolt 14. The modified form 20a is also provided with a downwardly extending hump 29 and a rearwardly and upwardly extending portion 30 having a downwardly directed longitudinally extending ear 31 adapted to abut against the inwardly extending boss 19 of the other blade 11. The modified strip 20a is also bowed slightly upwardly from the hump 29 to the forward end 27, so that tension between the blades 10 and 11 may be controlled by manual adjustment of the locking nut 15.

Operation

The manner in which the tension controlling device embodied in the forms indicated generally by the numerals 20 and 20a, can be used to control tension between the blades 10 and 11 has already been described, but in addition, it will be seen that this device is also effective to absorb the shocks which would normally be experienced when the blades 10 and 11 were permitted to pivot with respect to each other to the full extent so as to cause the bosses 18 and 19 to come into abutting engagement with each other.

To prevent the shock normally caused by this engagement between the bosses and to cushion the impact when closing the blades, the flexible strips 20 and 20a are arranged so as to rotate with one of the blades 10, in the one case, by the engagement between the rivet 22 and the recess 23, and in the other case by means of the nib 28. At the other end, the ear 26 in the one case, and the ear 31 in the other case, is arranged to be spaced from the boss 18 so that the boss 19 on the other blade 11, instead of coming into engagement with the boss 18 when the blades are closed, will first come into engagement with the ear 26 or 31, as the case may be. Due to the fact that these ears are offset with respect to the rear ends 25 or 30 of the flexible strips, the impact of engagement will cause this rearward portion to twist slightly and in most cases cushion the shock of closing the blades 10 and 11 without permitting actual engagement with the boss 18.

While there have been disclosed in this specification two forms in which the invention may be embodied, it is to be understood that these forms are shown for the purpose of illustration only, and that the invention is not limited to the specific disclosures, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In a tension controlling device for hedge shears having a pair of blades connected in overlapping relation by a fulcrum bolt, each of said blades having a rearwardly extending portion, an elongated strip of flexible metal adapted to be rotatably received at a medial point by said fulcrum bolt, said strip bearing against one of said blades at two points spaced on opposite sides of said medial point, means to urge said strip toward said one blade at said medial point, and means to hold said strip nonrotatably with respect to said one blade, a portion of said strip spaced from said medial point being disposed to yieldably engage with a rearwardly extending portion of said other blade to absorb shock.

2. The invention as defined in claim 1, wherein said means to hold said strip with respect to said one blade comprises a rivet projecting from one end of said strip and adapted to be received in a recess in said one blade.

3. The invention as defined in claim 1, wherein said means to hold said strip comprises a reduced portion of said strip extending at right angles to form a nib adapted to be received in a recess in said one blade.

4. In a shock absorbing device for hedge shears having a pair of blades oscillatory about a common pivot, an elongated flat strip of flexible material, means to mount said strip on said common pivot for rotation with respect to one of said blades, one end of said strip extending outwardly from said pivot in a plane parallel to and spaced from the plane of oscillation of said other blade, and means extending angularly to the plane of said one end in alignment with a portion of said other blade to absorb shocks when said blades are closed.

5. The invention as defined in claim 4, wherein one end of said flat strip extends at right angles to form an ear located in a plane parallel to the axis of said common pivot.

6. In hedge shears, having a pair of forwardly extending blades pivotally connected in overlapping relationship and rearwardly extending handles, tension controlling means including a flexible element, means to distort said flexible element about one axis to maintain said blades in cutting engagement with one another, and means to distort said flexible member about another axis to cushion the shock of closing said blades.

No references cited.